United States Patent Office 2,854,475
Patented Sept. 30, 1958

2,854,475

PRODUCTION OF PLASTICIZERS FROM OXO ALCOHOLS OF THERMALLY CRACKED DEAROMATIZED CATALYTICALLY CRACKED CYCLE OIL

Han Hoog and Albert Schaafsma, The Hague, Netherlands, assignors to Shell Development Company, New York, N. Y., a corporation of Delaware No Drawing. Application May 7, 1956
Serial No. 582,917

Claims priority, application Netherlands May 13, 1955

10 Claims. (Cl. 260—475)

This invention relates to an improvement in the production of plasticizers. The invention relates more particularly to an improved process enabling the efficient conversion of available low cost material to valuable saturated aliphatic alcohols having at least six carbon atoms to the molecule of high purity particularly suitable for the production of plasticizers therefrom.

Methods disclosed heretofore directed to the production of higher alcohols comprise the so-called Oxo synthesis. In accordance with this method olefins are reacted with carbon monoxide and hydrogen in the presence of a carbonylation catalyst, for example, a cobalt-containing catalyst, in a first stage of the process under carbonylation conditions resulting in the obtaining of a reaction product comprising aldehydes having one more carbon atom per molecule than the olefin charge. The resulting aldehyde-containing reaction mixture is subjected to a hydrogenation in a second stage of the process to convert the aldehydes to the corresponding saturated alcohols. The Oxo synthesis involving successive carbonylation and hydrogenation may be referred to as a hydrocarbonylation. Thus, alkenes having, for example, from 6 to 8 carbons in the molecule are converted to saturated aliphatic alcohols having from 7 to 9 carbon atoms to the molecule by means of such hydrocarbonylation.

It is now well known that the suitability of a plasticizer of the ester type for use in many important fields of application is often governed by characteristics unavoidably imparted thereto as a consequence of the materials, especially the alcohols, from which they are produced. The production of the higher alcohols capable of being employed in the production of the ester-type plasticizers therefrom is therefore limited to methods providing the desired alcohols in the necessary high state of purity. This generally entailed the need for the use of initial raw materials which are often relatively costly or difficult to produce and which often are available only in limited amounts. In the preparation of the said higher alcohols via practical scale hydrocarbonylation, the starting materials have hitherto been pure, or practically pure, alkenes obtained by the polymerization of normally gaseous alkenes such as propene and butene. Commercially available hydrocarbon mixtures rich in alkenes, for example, such as obtained by thermal vapor phase cracking of paraffin wax, or other hydrocarbon mixtures rich in paraffins, have also been used. Such initial materials are, however, not always available in sufficient quantities to satisfy the ever-increasing demand for Oxo alcohols suitable for conversion to ester-type plasticizers. Initial materials of this type are, furthermore, relatively costly. It would therefore be of great practical importance if another cheaper source of the alkenes and derivative alcohols suitable for ester-type plasticizer production were available.

It is an object of the present invention to provide an improved process enabling the more efficient production of ester-type plasticizers from relatively low-cost material.

Another object of the present invention is the provision of an improved process enabling the efficient production of aliphatic alcohols having at least 6 carbon atoms to the molecule in a high state of purity from relatively low-cost materials.

A still further object of the invention is the provision of an improved process enabling the efficient production of saturated aliphatic alcohols having from 7 to 9 carbon atoms to the molecule, particularly suitable for the production of ester-type plasticizers therefrom, from readily available low-cost materials.

In accordance with the invention aliphatic saturated alcohols having at least six carbon atoms to the molecule of high purity, particularly suitable for the production of ester-type plasticizers therefrom are obtained by thermal vapor phase cracking of dearomatized catalytically cracked "cycle oil," separating a fraction, preferably one predominating in $C_6$ to $C_8$ alkenes, from the resulting thermally cracked products, and hydrocarbonylating said thermally cracked $C_6$–$C_8$ alkene fraction to aliphatic saturated alcohols consisting essentially of alcohols having from 7 to 9 carbon atoms to the molecule. The $C_7$–$C_9$ alcohols thus obtained are readily esterified to esters particularly suitable as plasticizers of unusually high quality.

In applicants' copending United States application, Serial No. 541,826, filed October 20, 1955, of which the present application is a continuation-in-part, there is disclosed and claimed a method for the production of olefins from the recycle stream obtained in the catalytic cracking of hydrocarbons. In accordance with the process of said copending application hydrocarbons, for example, a naturally-occurring hydrocarbon mixture such as petroleum comprising constituents boiling above about 300° C., are subjected to catalytic cracking, and a fraction having a boiling temperature above about 300° C. (cycle oil) fractionated from the resulting catalytically cracked products is freed of aromatic components and thermally cracked in the vapor phase. A fraction comprising olefins having at least five carbon atoms to the molecule, for example, from about 5 to about 18 carbon atoms to the molecule, is separated from the resulting thermally cracked products. In accordance with said copending application the olefins produced are employed in the production of aryl alkanes from which surface-active alkyl aryl sulfonates are produced by sulphonation.

It has now been found that the cracked higher alkenes, particularly a fraction thereof containing the $C_6$ to $C_8$ olefins, obtained by the thermal vapor phase cracking of a high boiling hydrocarbon recycle stream (cycle oil) produced in the catalytic cracking of hydrocarbons, are converted to valuable higher saturated aliphatic alcohols by hydrocarbonylation by the Oxo synthesis. The Oxo alcohols resulting from this specific charge material are found to be outstanding in characteristics rendering them of particular value for the production of high-quality, ester-type plasticizers therefrom. Thus, esterification of the alcohols of this source with polycarboxylic acids such as, for example, phthalic acids, results in phthalate esters possessing to an unusually high degree the characteristics demanded of a high grade plasticizer. The invention thus enables the obtaining of high grade ester plasticizers from relatively low cost material having properties at least equivalent to comparable plasticizers made by methods disclosed heretofore relying on costly initial starting materials.

That the heavy recycle stream of a catalytic hydrocarbon cracking operation should enable the production of the desirable Oxo alcohols, and derivative esters, therefrom in such a high state of purity is highly unexpected since the portion of the heavy catalytically cracked recycle oil remaining after removal of aromatics therefrom has a high content of naphthenic and branched-chain paraffinic hydrocarbons. The composition of this dearomatized catalytic-cracking, heavy recycle oil therefore differs greatly from the hydrocarbon materials rich in normal paraffins and of natural origin heretofore considered most desirable for the production of higher alkenes therefrom via hydrocarbonylation by the Oxo synthesis.

The present invention is of particularly great practical importance because it enables the heavy cycle oil, which is produced in great quantities in catalytic cracking processes, and which, if not recycled for economic reasons, constitutes a by-product of relatively little value, to be used for the preparation of valuable higher olefins and their derivatives for which there is a constantly increasing need.

The catalytic hydrocarbon cracking step by which the heavy hydrocarbon oil recycle stream (which is to be dearomatized and thermally cracked) is produced is carried out under conventional catalytic hydrocarbon cracking conditions. The catalyst may be a natural or synthetic composite of silica and alumina which may be employed as a fluidized solid, as a moving bed or a fixed bed in a manner well known to the art. Suitable feed to the catalytic cracking operation comprises a petroleum oil containing a substantial proportion, e. g. between 50 and 100%, boiling above 300° C. This may be a heavy distillate, e. g. boiling from 300 to 600° C., or it may be a topped or a reduced crude oil. Temperatures in the cracking step generally are in the range between 430 and 540° C. at relatively low pressures, e. g. between 0 and 50 lbs. per sq. inch. The catalyst employed in the catalytic cracking step is periodically regenerated by burning with a free oxygen-containing gas in conventional manner. The cracking operation may be a so-called "once through" operation in which only fresh feed is charged to the cracking unit or it may be a "recycle" operation in which a fraction of the effluent stream from the reactor, boiling above 300° C., is returned to the catalytic cracking unit. Superior feed stocks for the subsequent thermal cracking step of the present invention are produced by operating the catalytic cracking step at relatively severe conditions, i. e. at temperatures above 485° C. when operating once through, or at recycle rates (ratio of total feed to fresh feed) of between 1.2 and 2.0. Superior feed stocks for the thermal cracking step of the present invention are also produced when the oil charged to the catalytic cracking step is produced from a highly paraffinic crude, e. g. a Middle Eastern crude, such as Kuwait, or a Pennsylvania crude.

Effluence from the catalytic cracking zone is fractionated into several fractions including the lighter hydrocarbon fractions such as the normally gaseous hydrocarbons, gasoline, kerosene and others, and including a distillate fraction boiling above 300° C. and a bottoms fraction. The distillate fraction boiling above 300° C. is often referred to as "cycle oil" in the fluidized catalytic cracking art because frequently the whole or a part of this fraction is recycled back to the cracking step. The bottoms fraction obtained in the fluidized operation is referred to as "slurry oil" because it generally contains some entrained catalyst. This entrained catalyst may or may not be separated, and the slurry oil also is often returned to the cracking step.

According to the present invention, the cycle oil, either by itself or admixed with the slurry oil, is dearomatized, for example, by an extraction treatment, to remove aromatic hydrocarbons therefrom. The extraction may be carried out by liquid-liquid contacting with a selective solvent for aromatics, or by contact with a solid adsorbent selective for aromatics. A variety of known solvents may suitably be employed to secure the desired selective removal of aromatics, e. g. furfural, liquid sulfur dioxide, mixtures of phenol and water, and the like. The treatment is preferably carried out by countercurrent contact in at least three extraction stages. Furfural and mixtures of phenol and water were found particularly suitable for purposes of the present invention, since a practically aromatic-free raffinate was easily obtained therewith even when using moderate solvent ratios, e. g. between 2.0 and 3.5. Liquid sulfur dioxide was also found to be suitable. The extraction treatment is conveniently carried out at a slightly elevated temperature, e. g. between 50 and 80° C. Solid adsorption separation may be carried on by use of silica gel as adsorbent.

The extraction treatment is preferably carried out by counter-current contact. Although a variety of equipment may be employed, an extraction column such as described in U. S. Patent No. 2,601,674 to G. H. Reman may be advantageously used for this purpose, the column being provided with a rotatable shaft with a number of discs and, on its inner wall, at points approximately halfway between the discs, with rings the internal diameter of which is larger than the diameter of the discs.

Extraction conditions are selected to produce a raffinate containing no more than 5% by weight and preferably no more than 1.5% by weight of aromatics. Heavy cycle oil obtained in the catalytic cracking of mineral oils rich in sulfur, such as certain Middle East oils, has a relatively high sulfur content, e. g. 2 to 3%. In extracting a heavy cycle oil of this type the sulfur compounds present are largely removed together with the aromatics, so that a practically sulfur-free raffinate is obtained.

The thermal cracking of the dearomatized catalytically cracked cycle oil in accordance with the present invention is carried out at conditions which are conventional for the vapor phase cracking of wax to produce higher olefins, e. g. by heating the vapors of the raffinate together with an inert diluent, conveniently steam, to a high temperature in the range from 500° C. to 600° C., preferably between 550 and 560° C., for a short period, e. g. up to a few seconds, at pressures between 1 and 5 atmospheres. The cracked product obtained, after separation of the normally gaseous components, are then fractionated to separate an olefin fraction boiling up to 350° C. and a high boiling bottoms product therefrom. The latter may be recycled to the thermal cracking zone.

The olefins so produced according to the present process should preferably have a maximum boiling temperature of 350° C. It is therefore essential that the charge to the vapor phase thermal cracking step of the process contains no substantial amount of components boiling below 350° C. because these would contaminate the substantially completely olefinic product. In one modification of the process, therefore, the cycle oil charged to the extraction step is distilled to remove components boiling below 350° C. It has been found, however, that components boiling between 300 and 350° C. are substantially entirely aromatic in nature and are removed with the extract, so that even when charging a cycle oil of an initial boiling point of 300° C. the raffinate resulting from the extraction step generally has the desired initial boiling point above 350° C. The product produced in the vapor phase cracking step generally consists predominantly of olefins having from 5 to 18 carbon atoms to the molecule and has an olefin concentration between 85 and 90% by weight or higher.

The aromatic extract which is obtained in the extraction of the heavy cycle oil and chiefly consists of polycyclic compounds, such as naphthalene derivatives, may be employed as fuel, as a heat transmission agent, as a component in weedkillers or as a source of chemical intermediates.

The thermally cracked olefinic product thus obtained is fractionated into fractions each predominating in olefinic components differing from one another by no more than three carbon atoms. Thus, the suitable fraction separated therefrom may consist essentially of monoolefins having, for example, from 6 to 8 or from 8 to 9, carbon atoms to the molecule.

The olefinic fractions thus obtained by thermal cracking of dearomatized catalytically cracked cycle oil are hydrocarbonylated via the Oxo synthesis to saturated aliphatic alcohols. Conventional hydrocarbonylation conditions are employed to convert the olefins to alcohols. Thus carbonylation of the olefins by reaction with carbon monoxide and hydrogen gas is carried out in the presence of a suitable conventional, for example, cobalt-containing, carbonylation catalyst under the known conditions of temperature and pressure of the Oxo process. The resulting aldehydic products of the olefin carbonylation are hydrogenated in the presence of a suitable catalyst, for example, a nickel catalyst under conventional hydrogenating conditions to the corresponding alcohols. In this wise, the olefinic fractions charged to the hydrocarbonylation are converted to saturated aliphatic alcohols containing one more carbon atom than the olefins charged.

The alcohols, for example, the fractions consisting essentially of $C_7$ to $C_9$, and of $C_9$ to $C_{11}$ saturated aliphatic alcohols thus obtained are of exceedingly high purity as evidenced by the characteristics of the polycarboxylic acid esters prepared therefrom.

The alcohols thus obtained are converted to suitable esters of polybasic aliphatic or aromatic carboxylic acids such as, for example, adipic acid, methyl adipic acid, sebacic acid, phthalic acid and the like. Esterification of the alcohols is carried out under conventional esterification conditions of temperature and pressure. Any of the known esterification catalysts, for example, the strong mineral acids, may suitably be employed. The resulting polycarboxylic acid esters, especially the phthalates, have been found to be excellent plasticizers, particularly for polyvinyl chloride; their quality for this use is excellent and in no way inferior to that of corresponding esters of Oxo alcohols prepared from alkenes, obtained from natural initial materials rich in paraffin such as paraffin wax. Mixtures of Oxo alcohols obtained from lower and higher alkene fractions of the thermally cracked dearomatized cycle oil may also be advantageously worked up to esters, e. g. phthalates, of excellent quality. Thus, for example, mixed phthalates may be prepared from a mixture of $C_6$ alcohol and $C_9$-$C_{10}$ alcohols obtained from the $C_5$ and $C_8$-$C_9$ alkene fraction of the vapor phase cracked distillate, which phthalates have a plasticizing quality which is comparable to that of the mixed phthalates from $C_7$-$C_9$ alcohols. Thus, it is possible to work up a wide range of the olefinic cracked distillate to Oxo alcohols suitable for the manufacture of valuable plasticizers therefrom.

The esters of the Oxo alcohols prepared according to the invention, particularly those with aliphatic polycarboxylic acids such as adipic acid and sebacic acid, are valuable as synthetic lubricants for special purpose use.

The invention will be further illustrated by the following examples, the first of which relates to the preparation of the Oxo alcohols, and the second to the preparation of phthalic acid esters from these Oxo alcohols.

*Example I*

A mixture of heavy cycle oil (boiling between about 300 and 500° C.), obtained by fractionating the liquid cracked products obtained by the catalytic cracking of a Middle East mineral oil, and the slurry oil drawn off as a bottoms product in this fractionation, was dearomatized. Before dearomatization, this mixture consisted of 55% by weight of aromatics and the remainder of paraffins and naphthenes. The dearomatization was effected by liquid-liquid extraction with furfural at 60° C. to 70° C. in an apparatus as described in U. S. Patent No. 2,601,674, issued June 24, 1952, having the equivalent of 5 theoretical extraction stages. Thirteen liters of the oil mixture and 45 liters of furfural were charged per hour. 41.7% by weight of raffinate was obtained which contained 63.5% naphthenes and isoparaffins, 35% n-paraffins and only 1.5% aromatics. The raffinate so obtained was now thermally cracked in the vapor phase. To this end it was first vaporized as completely as possible at a maximum temperature of 470° C., together with a fraction of the cracked products boiling above 300° C., which was recycled in a ratio of 2.9:1 by weight based upon the raffinate charged. The resulting vapors, after separation of any unvaporized material, were passed through a cracking furnace at a maximum temperature of 550° C. for a contact period of 3.6 seconds, together with 6.5% by weight of steam. The portion of the cracked product obtained boiling above 300° C. was recycled to the fresh raffinate charge. The portion boiling below 300° C. was separated by fractional distillation into a fraction containing gaseous alkenes, a $C_5$ alkene fraction, a $C_6$-$C_8$ alkene fraction, a $C_9$-$C_{13}$ alkene fraction and a $C_{14}$-$C_{18}$ alkene fraction. The $C_6$-$C_8$ alkene fraction thus obtained in a quantity of 14.4% by weight (calculated on raffinate supplied), boiling between 55° C. and 119° C., had a bromine number of 165. After treatment with approximately 3% sulfuric acid of 96% at room temperature for 45 minutes, in order to remove dienes, this fraction was hydrocarbonylated to $C_7$-$C_9$ Oxo alcohols.

Hydrocarbonylation was effected by carbonylating the $C_6$-$C_8$ alkenes to aldehydes by treating the alkenes in an autoclave with water gas, in the presence of 3% by weight of colbalt on kieselguhr catalyst under a pressure of 140 atmospheres and at a temperature of 90° C. After 30 minutes the temperature was rapidly increased to 140° C. Introduction of water gas was continued at this temperature and at approximately 250 atmospheres until the pressure drop was less than 8 atmospheres for a 15-minute period. The resulting reaction product was cooled, gas vented therefrom and then freed of cobalt carbonylic compounds by pressing in hydrogen up to a pressure of 50 atmospheres, heating for two hours at 160° C. and then, after cooling, venting gas and pressing in hydrogen.

The decobalted aldehydes thus obtained were then converted into alcohols by heating with hydrogen at 185° C. under 140 atmospheres in the presence of 2% by weight of nickel-on-kieselguhr catalyst; the hydrogenation being continued until the pressure remained constant for one hour. After filtering off the catalyst the resulting alcohols were distilled, the fraction boiling between 161° C. and 221° C. being separated as $C_7$-$C_9$ alcohols in a yield of 66.6%. In order to remove formeates formed during carbonylation, these $C_7$-$C_9$ alcohols were then subjected to an after-hyrdrogenation with hydrogen at 250° C. under a pressure of 140 atmospheres in the presence of 10% by weight of copper-chromite catalyst. After this refining treatment and filtering off of the catalyst, the alcohols were redistilled, whereby a small fraction boiling below 161° C. was separated off, and the $C_7$-$C_9$ alcohols were recovered as a substantially colorless fraction boiling above 161° C., 98% by volume of which boiled up to 199° C. These alcohols contained no detectable amount of impurities.

*Example II*

Mixed $C_7$-$C_9$ alcohols prepared according to Example I and phthalic anhydride in a mole ratio of 2.06:1 were heated together with a gasoline fraction boiling between 80° C. and 110° C., while stirring, until a honogeneous solution had formed. Then 1% by weight (based on phthalic acid anhydride) of sulfuric acid (of 98%) was added and the mixture heated at 105° C. to 115° C., while stirring; water which formed being azeotropically distilled off. After 4 to 5 hours the esterification was complete.

After cooling to 75° C., the product was neutralized with a soda solution, washed with water, and the gasoline distilled off under reduced pressure at 75° C.–115° C. The excess alcohol was removed by steam distillation at 115° C. and a pressure of 5–10 cm.

The crude phthalates were then purified by heating them with 1% lime and 0.02% potassium permanganate (as a 1% aqueous solution), while stirring vigorously, for 45 minutes at 100° C. to 120° C., followed by heating for some hours at 80° C. in the presence of 2% of activated carbon.

The purified phthalates were obtained in a yield of 95% (based on alcohols), were substantially colorless and of excellent quality for use as plasticizers.

Evaluation in a composition of polyvinyl chloride, which contained 60 parts by weight of phthalate esters per 100 parts by weight of polyvinyl chloride, showed that the plasticizing properties of these phthalates were in all respects equivalent to those of phthalates prepared from cracked paraffin wax starting materials, and to those of the much used di-(2-ethyl hexyl) phthalate.

We claim as our invention:

1. The process for the production of saturated aliphatic alcohols having from seven to eleven carbon atoms to the molecule possessing characteristics rendering them particularly suitable for conversion by esterification to high quality ester-type plasticizers which comprises thermally cracking in the vapor phase at 500–600° C. under olefin-forming conditions a 300–500° C. fraction of dearomatized catalytically cracked cycle oil, separating a fraction comprising olefins having from six to ten carbon atoms to the molecule from the resulting thermally cracked products, and hydrocarbonylating said olefinic fraction via the Oxo synthesis to saturated aliphatic alcohols having from seven to eleven carbon atoms to the molecule.

2. The process in accordance with claim 1 wherein said cycle oil is dearomatized by liquid phase extraction with furfural.

3. The process in accordance with claim 1 wherein said cycle oil is obtained by the catalytic cracking of a Middle East crude petroleum.

4. The process in accordance with claim 1 wherein said dearomatized cycle oil subjected to vapor phase thermal cracking contains naphthenic and isoparaffinic components in predominant amount.

5. The process for the production of saturated aliphatic alcohols having from 9 to 11 carbon atoms to the molecule possessing characteristics rendering them particularly suited to the production of high quality ester-type plasticizers therefrom by esterification which comprises, thermally cracking in the vapor phase at 500–600° C. under olefin-forming conditions a fraction of catalytically cracked cycle oil having an initial boiling temperature of abolt 300° C. and a maximum boiling temperature of about 500° C. and comprising naphthenic and isoparaffinic hydrocarbons, separating a fraction comprising olefins having from 8 to 10 carbon atoms to the molecule from the resulting thermally cracked products, and hydrocarbonylating said olefinic fraction via the Oxo synthesis to Oxo alcohols having 9 to 11 carbon atoms to the molecule.

6. The process for the production of saturated aliphatic alcohols of high purity having from 7 to 9 carbon atoms to the molecule possessing characteristics enabling their conversion by esterification to valuable ester-type plasticizers which comprises, thermally cracking in the vapor phase at 500–600° C. under olefin-forming conditions a dearomatized 300–500° C. cycle oil obtained by catalytically cracking petroleum hydrocarbons, separating a fraction comprising olefins having from 6 to 8 carbon atoms from the resulting thermally cracked products, and hydrocarbonylating said olefinic fraction by means of the Oxo synthesis to saturated aliphatic alcohols having 7 to 9 carbon atoms to the molecule.

7. The process for the production of high quality esters from catalytically cracked cycle oil which comprises, thermally cracking in the vapor phase at 500–600° C. under olefin-forming conditions a dearomatized cycle oil fraction having a boiling range of 300–500° C. obtained by catalytically cracking petroleum hydrocarbons, separating a fraction comprising olefins of from 6 to 8 carbon atoms from the resulting thermally cracked products, hydrocarbonylating said olefinic fraction to alcohols having 7 to 9 carbon atoms, and esterifying said alcohols with an acid of the group consisting of polybasic aliphatic and aromatic carboxylic acids.

8. The process in accordance with claim 7 wherein said cycle oil is obtained by the catalytic cracking of a Middle East crude petroleum.

9. The process in accordance with claim 7 wherein said dearomatized cycle oil subjected to thermal cracking contains naphthenic and isoparaffinic hydrocarbons in predominant amount.

10. The process in accordance with claim 7 wherein said acid is phthalic acid.

References Cited in the file of this patent

UNITED STATES PATENTS

| 2,752,386 | Ackroyd et al. | June 26, 1956 |
| 2,754,321 | Hoog et al. | July 10, 1956 |

FOREIGN PATENTS

| 678,926 | Great Britain | Sept. 10, 1952 |

OTHER REFERENCES

Wender et al.: Report of Investigations, U. S. Dept. of Interior, Bureau of Mines, June 1948, pp. 4 and 5 and Figure I.